Patented Dec. 1, 1953

2,661,350

UNITED STATES PATENT OFFICE 2,661,350

ISOTHIURONIUM SALT OF PENICILLIN

Rudolf Hiltmann and Klaus Bauer, Wuppertal-Elberfeld, Germany, assignors to Schenley Industries, Inc., New York, N. Y., a corporation of Delaware No Drawing. Application October 22, 1952,
Serial No. 316,310

2 Claims. (Cl. 260—239.1)

This invention relates generally to chemotherapeutic agents and, more particularly, it is concerned with a novel salt of penicillin having properties especially suiting it for use in processes for the purification of penicillin wherein the penicillin is to be precipitated as a substantially insoluble salt, and which is also useful in chemotherapy where high blood levels of parenterally administered penicillin are necessary or desirable.

The term penicillin, in accordance with common usage, designates herein both the acidic, salt-forming antibiotic agent which may be obtained from fermentation operations according to known procedures, and also the substances of which this antibiotic agent is comprised, a mixture of individually identifiable compounds, some of which have been designated penicillin F, G, X, O, K, etc. Penicillin, as a mixture, and also its components, individually, have been widely utilized in chemotherapy in the form of their alkali metal or alkaline earth metal salts, particularly the potassium of sodium salts. These salts may be produced by treating highly purified forms of penicillin with a suitable alkali metal or alkaline earth metal reagent, whereby the corresponding alkali metal or alkaline earth metal salt of penicillin is produced by a simple metathetical reaction. The salt-forming reaction may be conducted in an aqueous medium, from which the product salt may be recovered by vacuum dehydration at room or elevated temperatures or while in frozen state. These salts are well crystallized and thus may be obtained in a high degree of purity. They are readily soluble in water or isotonic saline solutions, which facilitates the preparation of solutions for parenteral administration.

However, these alkali metal and alkaline earth metal salts of penicillin have certain disadvantages, for instance, they are costly to produce if vacuum dehydration of the frozen solution is a step in the process of manufacture, and they are relatively unstable when in solution, losing their activity unless stored under refrigeration. Furthermore, when simple aqueous solutions of these salts are injected intramuscularly, the initially high, therapeutically effective, penicillin blood levels which may be produced are maintained but briefly. Because the antibiotic is rapidly removed from the situs of injection, and excreted, often repeated injections of fresh material are required to maintain therapeutically effective concentrations of the penicillin, which is both troublesome to the patient and wasteful of the antibiotic. It was found that somewhat more satisfactory retention of the antibiotic in the vicinity of the situs of administration could be obtained by using oil suspensions of the penicillin alkali metal or alkaline earth metal salts, but even under these conditions, the excretion of the antibiotic was found to be unsatisfactorily rapid and the necessary high penicillin blood levels could be maintained only by frequently repeated injections.

Investigations were undertaken to develop more satisfactory forms of penicillin and, in the course of these investigations, it was found that if concentrated aqueous solutions of highly purified forms of penicillin or its alkali metal salts are treated with procaine base or a procaine salt, the procaine salt of penicillin may be obtained as a crystalline precipitate. It was found, also, that the procaine salt of penicillin, obtained in this manner, is a relatively stable compound that is merely sparingly soluble in water and in body fluids. These properties suggested its chemotherapeutic usefulness in instances where it might be desirable that a slowly dissolving form of penicillin be placed near the situs of infection to maintain substantially constant high therapeutically effective levels of the antibiotic in this locality. It was found, when a highly purified procaine salt of penicillin was administered in this manner, as an aqueous suspension or, preferably, as a suspension in a gelled vegetable oil such as gelled sesame oil, high penicillin blood levels could be maintained for a substantial period, in some instances as long as 96 hours following administration of a single injection containing 300,000 I. U. of the medicament in oil gelled with addition of about 2% of aluminum stearate.

However, although the procaine salt of penicillin was found to be more satisfactory as a therapeutic form of the antibiotic than were the simple alkali salts of penicillin, nevertheless experience indicated that the procaine salt was not to be regarded as being necessarily the ultimately desirable form of the antibiotic, for it is appreciably soluble in water and body fluids, even though its solubility is small, thus making it necessary to repeat the administration of the drug. Another disadvantage of the procaine salt of penicillin, primarily of importance from the drug manufacturer's viewpoint, is that unless highly purified starting materials are used and certain solvents are employed as reaction media when making the salt, a non-crystalline, oily or tarry mass may be obtained. A need has been felt, therefore, for a new, therapeutically useful, non-toxic form of penicillin, which would be no more, and preferably less, soluble than procaine penicillin, and which could be obtained readily in a pure, crystalline state without need for the use of highly purified starting materials. It is an object of this invention to provide a novel penicillin product that satisfies this need.

Although it is well known that penicillin is capable of forming ammonium type salts when treated with various nitrogenous organic bases, these penicillin salts, generally, are so readily soluble in water that the salts can be obtained in a crystalline form only with extreme difficulty. In accordance with this invention, its is found that a certain nitrogenous organic base forms penicillin salts which not only is non-toxic, has the therapeutical usefulness of the procaine salt of penicillin, and may be easily obtained as substantially pure crystals, but which, surprisingly, is even less soluble in water than is procaine penicillin.

In accordance with this invention, it also is found that a certain nitrogenous organic base salt of penicillin, because of its extreme insolubility in water or aqueous mixtures, is a useful intermediate in processes for the preparation of pure forms of penicillin.

In accordance with this invention, it is now found that penicillin is able to form a salt with phthalimido-N-ethylene-isothiourea that is even more difficultly-soluble in water than procaine penicillin and that is, additionally, obtainable in a well crystallized state. This salt is prepared, according to this invention, by reacting penicillin or a penicillin salt with phthalimido-N-ethylene-isothiourea or a salt thereof, and isolating the difficultly-soluble salt thus formed in conventional fashion. Penicillin G has proven especially suitable for use in this reaction. The prolongation of therapeutically effective blood levels by use of this new penicillin salt is even more protracted than is obtained by use of procaine penicillin.

The novel aroylaminoalkyleneisothiourea salt of penicillin according to this invention is the penicillin salt of the organic nitrogenous base represented by the formula:

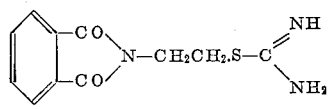

The penicillin salt of phthalimido-N-ethylene-isothiourea may be administered suspended in aqueous or oily vehicles, including, if desired, such known absorption-retarding additives as beeswax or other waxes, or oil gelled with aluminum monostearate.

Furthermore, this difficultly water-soluble salt of penicillin may be utilized for isolating penicillin from aqueous solutions, thus facilitating purifying it.

The number of organic bases is small that form difficultly water-soluble, readily crystallized salts with penicillin. The discovery of a new, therapeutically useful, penicillin salt of greater repository effect is therefore to be regarded as an important contribution to technology.

In order to facilitate a better understanding of the principles of this invention and how the novel penicillin salt of this invention may be prepared, a specific example herewith follows in which the preferred mode for preparing the salt is described.

EXAMPLE

About 3.30 grams of phthalimido-N-ethylene-isothiouronium bromide is dissolved in the minimum amount of hot water and the solution is mixed with a cold solution of 3.56 grams of penicillin G sodium dissolved in 15 cubic centimeters of water. After a short time, the phthalimido-N-ethylene-isothiourea salt of penicillin G crystallizes from the solution and is filtered off under vacuum, washed with little water, and dried. Its melting point is 146° C. and its potency is 1000 international units per milligram.

The phthalimido-N-ethylene-isothiouronium bromide used as a starting material may be obtained by conventional routes of synthesis from N-β-bromoethyl phthalimide and thiourea. Its melting point is 240–242° C.

The manner in which penicillin blood levels are maintained following administration of the phthalimido-N-ethylene-isothiourea salt of penicillin, as compared with the blood levels maintained by procaine penicillin, is illustrated by the following data. Using rabbits weighing approximately 3.5 to 4.5 kilograms as experimental animals and injecting an aqueous suspension of the two salts of penicillin under comparison, at a dosage level of 300,000 international units, injected intramuscularly into the thigh muscles of the animal, the penicillin blood levels in the serum were found to be as follows (20 test animals being used and the results being averaged):

Serum content following injection of phthalimido-N-ethylene-isothiourea salt of penicillin:

6 hours _____ 4.4 i. u./ccs.
15 hours _____ 1.7 i. u./ccs.
21 hours _____ 1.2 i. u./ccs.
24 hours _____ 1.4 i. u./ccs.
40 hours _____ 0.5 i. u./ccs.

Serum content following injection of procaine penicillin under identical conditions and at the same dosage levels:

6 hours _____ 9.1 i. u./ccs.
15 hours _____ 3.8 i. u./ccs.
21 hours _____ 1.9 i. u./ccs.
24 hours _____ 1.3 i. u./ccs.
40 hours _____ 0.2 i. u./ccs.

It will be understood that in the following claims, the term penicillin refers to any of the several forms of penicillin such as are mentioned in the introductory portion of this specification. The preparation of salts of penicillins other than penicillin G substantially exactly parallels the preparation of the penicillin G salt described in the example.

Having thus described the subject matter of this invention, what it is desired to secure by Letters Patent is:

1. As a novel chemotherapeutic agent, an organic nitrogenous base salt of penicillin, said organic nitrogenous base being represented by the formula:

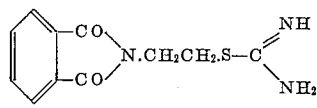

2. As a novel chemotherapeutic agent, an organic nitrogenous base salt of penicillin G, said organic nitrogenous base being represented by the formula:

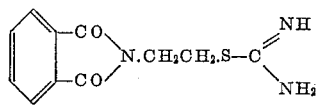

RUDOLF HILTMANN.
KLAUS BAUER.

No references cited